United States Patent
Middlemiss

(10) Patent No.: US 10,543,653 B2
(45) Date of Patent: Jan. 28, 2020

(54) CONSTRUCTION AND COMPOSITION OF PREFORMED CONTAINERS USED IN A HIGH-PRESSURE PRESS

(71) Applicant: Smith International, Inc., Houston, TX (US)

(72) Inventor: Stewart N. Middlemiss, Provo, UT (US)

(73) Assignee: SMITH INTERNATIONAL INC., Houston, TX (US)

( * ) Notice: Subject to any disclaimer, the term of this patent is extended or adjusted under 35 U.S.C. 154(b) by 298 days.

(21) Appl. No.: 15/283,988

(22) Filed: Oct. 3, 2016

(65) Prior Publication Data
US 2017/0136722 A1  May 18, 2017

Related U.S. Application Data

(62) Division of application No. 13/657,792, filed on Oct. 22, 2012, now Pat. No. 9,457,533.

(60) Provisional application No. 61/551,621, filed on Oct. 26, 2011.

(51) Int. Cl.
| | |
|---|---|
| B29C 43/22 | (2006.01) |
| B30B 11/00 | (2006.01) |
| B01J 3/06 | (2006.01) |
| C04B 35/645 | (2006.01) |

(52) U.S. Cl.
CPC ............ B30B 11/007 (2013.01); B01J 3/067 (2013.01); B30B 11/004 (2013.01); C04B 35/645 (2013.01); *Y10T 29/49826* (2015.01)

(58) Field of Classification Search
CPC ... B30B 11/004; B01J 3/067; Y10T 29/49826
USPC ............ 425/77, 330, 352–355, 348 S, 405.2
See application file for complete search history.

(56) References Cited

U.S. PATENT DOCUMENTS

| | | | |
|---|---|---|---|
| 2,918,699 A | 12/1959 | Hall | |
| 3,159,876 A | 12/1964 | Hall | |
| 3,182,353 A | 5/1965 | Hall | |
| 3,440,687 A | 4/1969 | Hall | |
| 3,914,078 A * | 10/1975 | Kendall | B01J 3/065 425/77 |
| 4,518,344 A | 5/1985 | Latreille et al. | |
| 5,858,525 A | 1/1999 | Carter et al. | |
| 8,074,566 B1 | 12/2011 | Bach | |
| 9,457,533 B2 * | 10/2016 | Middlemiss | B30B 11/004 |
| 2005/0150444 A1 | 7/2005 | Sung | |

(Continued)

FOREIGN PATENT DOCUMENTS

GB           930117 A       7/1963

OTHER PUBLICATIONS

UK Search Report of UK Patent Application Serial No. 1219156.5 dated Feb. 15, 2013. (1page).

(Continued)

*Primary Examiner* — Joseph S Del Sole
*Assistant Examiner* — Thu Khanh T Nguyen

(57) ABSTRACT

A container assembly for use in a high-pressure press having a central pressure cell and a method of sealing a central pressure cell. The container assembly includes a container that receives a sample to be pressed, and a gasket distinct from the container, the gasket meeting the container at an interface. The container and the gasket are dimensioned to locate the interface within the central pressure cell.

12 Claims, 7 Drawing Sheets

(56) References Cited

U.S. PATENT DOCUMENTS

2006/0032431 A1    2/2006   Sung
2007/0014965 A1    1/2007   Chodelka et al.
2008/0236107 A1   10/2008   Mastrogiacomo et al.

OTHER PUBLICATIONS

International Search Report and Written Opinion of PCT Application No. PCT/US2012/061465 dated Feb. 19, 2013: pp. 1-13.

\* cited by examiner

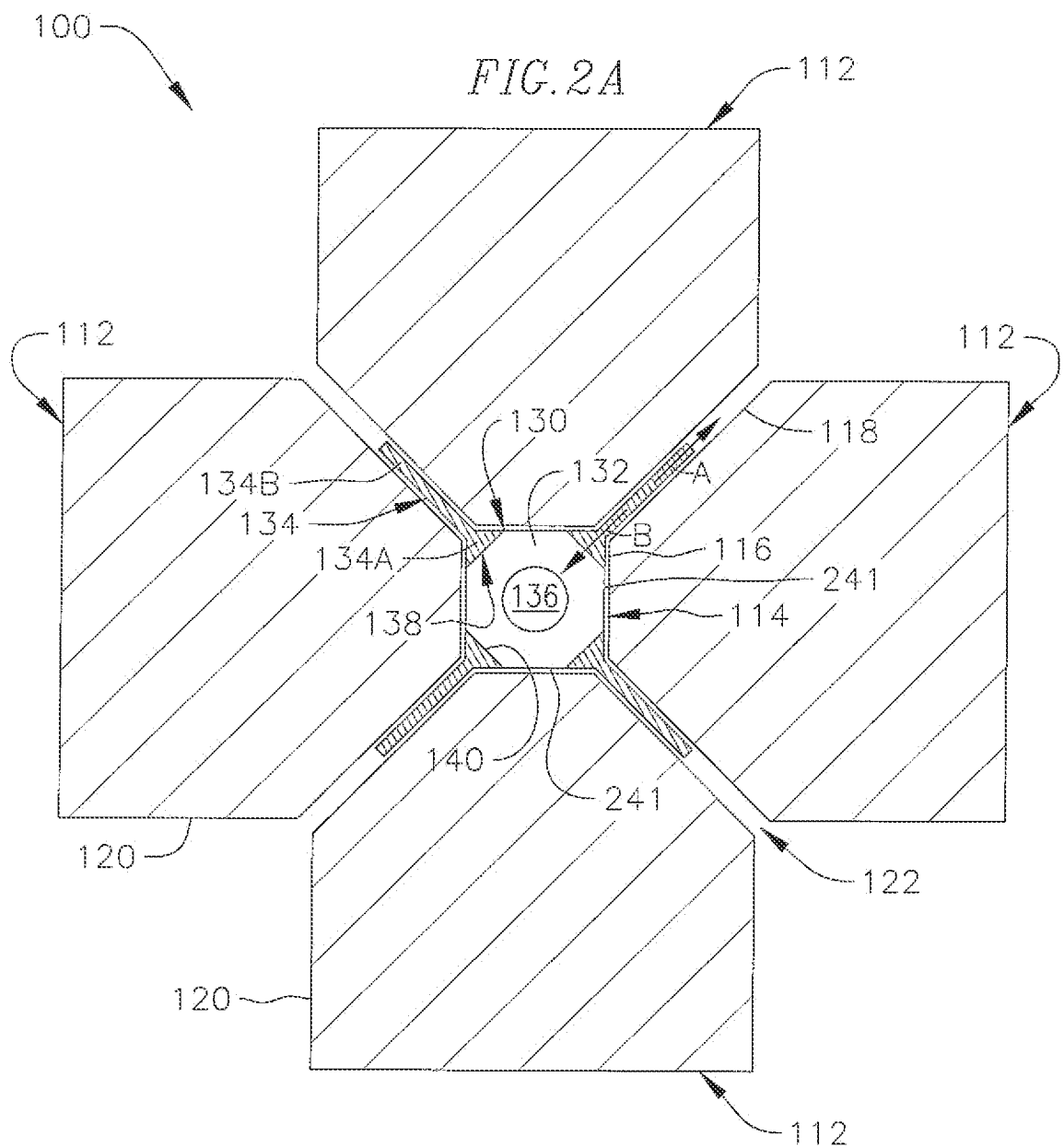

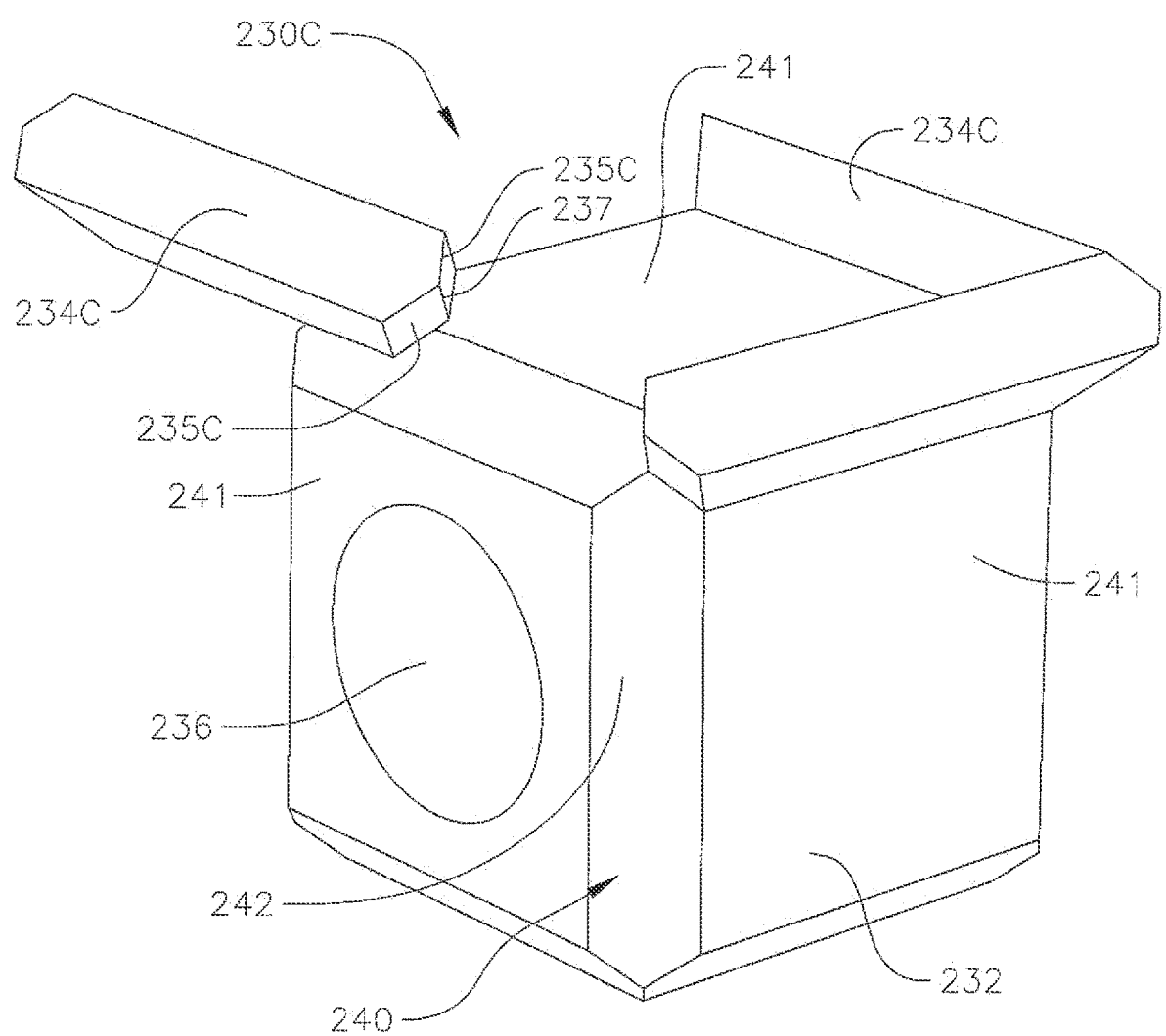

CONSTRUCTION AND COMPOSITION OF PREFORMED CONTAINERS USED IN A HIGH-PRESSURE PRESS

CROSS REFERENCE OF RELATED APPLICATIONS

This application is a divisional application of U.S. Pat. No. 9,547,533 filed Oct. 22, 2012, which claims benefit of U.S. Provisional Patent Application No. 61/551,621, filed on Oct. 26, 2011, which are incorporated herein by reference.

BACKGROUND

The present disclosure relates to containers for use in high-pressure presses, and more particularly to a container and gasket for use in a high-pressure press to form ultra-hard materials such as diamond and cubic boron nitride, and also relates to methods of sealing a central pressure cell of a high-pressure press.

Ultra-hard materials such as diamond and cubic boron nitride (CBN) are known for their desirable material properties and are used in cutting tools and rock drilling tools. These ultra-hard materials are formed by a high-pressure high-temperature sintering process ("HPHT sintering"), in which ultra-hard material particles are subjected to high temperature and pressure in a high-pressure press. The HPHT sintering process can include pressing the materials at a pressure not less than the 5 GPa and generally in the range of 5 to 15 GPa at an elevated temperature of not less than 1300° C. and generally in the range of 1300-2400° C.

This HPHT sintering process is conducted with a high-pressure press, such as a cubic press, a belt press, or a toroid press. The ultra-hard material sample that is being pressed is placed inside a container that is placed inside the press. To successfully transmit ultra-high pressures to the material sample inside the container, many requirements are placed on the container. The container should be sufficiently deformable to transmit pressure to the sample being pressed, and it should be able to flow during compression and decompression. However, the container should also have sufficient strength to seal the central pressure cell so that high pressure can be developed within the cell. In a high-pressure, multi-anvil press, the behavior of the container material is dynamic as the material flows from one region to another at different stages of the press cycle. Accordingly, there is still a need for a container that satisfies conflicting demands to transmit pressure and seal the high pressure cell during complex high pressure operations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Containers are provided for use in high-pressure presses, and more particularly a container and gasket for use in a high-pressure press to form ultra-hard materials such as diamond and cubic boron nitride are provided. In one embodiment, a container assembly is provided for use in a high-pressure press having a central pressure cell. The assembly includes a container that receives a sample to be pressed, and a gasket distinct from the container. The gasket meets the container at an interface. The container and the gasket are dimensioned to locate the interface within the central pressure cell. In an embodiment, twelve gaskets are mated to the container. The gaskets with the container define a cube. In one embodiment, each gasket defines an edge of the cube. In another embodiment, each gasket defines an accentuated edge of the cube.

In one embodiment, a high-pressure cubic press system includes six cubic anvils arranged about a central pressure cell with a gap between adjacent anvils. The system also includes a container placed within the central pressure cell. The container will receive a sample to be pressed. The system also includes a gasket distinct from the container, extending at least partially into the central pressure cell. In an embodiment, twelve gaskets are mated to the container. The gaskets with the container define a cube. In one embodiment, each gasket defines an edge of the cube. In another embodiment, each gasket defines an accentuated edge of the cube.

In one embodiment, a method for sealing a central pressure cell of a high-pressure press is provided. The method includes locating a container assembly in the central pressure cell of a high-pressure press. The container assembly comprises a container and a gasket material. The method also includes locating at least a portion of the gasket material within the central pressure cell, compressing the container and gasket, HPHT sintering a sample within the container, and decompressing the high-pressure press. Decompressing the press includes allowing the gasket material to move outwardly from the central pressure cell, and maintaining a pressure seal on the central pressure cell.

BRIEF DESCRIPTION OF THE DRAWINGS

FIG. 2A illustrates a cross-sectional view of a cubic press anvil assembly including an example container assembly according to an embodiment of the present disclosure.

FIG. 3C illustrates a partial perspective view of an example container assembly according to an embodiment of the present disclosure.

FIG. 4 illustrates a cross-sectional view of an example container assembly according to an embodiment of the present disclosure.

DETAILED DESCRIPTION

The present disclosure relates to containers for use in high-pressure presses, and more particularly to a container and gasket for use in a high-pressure press to form ultra-hard materials such as polycrystalline diamond and cubic boron nitride, and to methods of sealing a central pressure cell of a high-pressure press. In one embodiment, a container assembly includes a container and a gasket positioned in a central pressure cell of a high-pressure press. Prior to pressing, the gasket, or a portion of the gasket, is located within the central pressure cell with the container. During pressing operations, the gasket material flows between the advancing anvils and seals the pressure within the central cell. An amount of the gasket material is retained within the central pressure cell during compression and is able to flow outwardly from the cell during decompression, to allow a more controlled decompression process. This design improves gasket stability and enables pressure to be released from the central pressure cell in a stable manner. As a result, the high pressure in the pressure cell can be controlled during the HPHT sintering process, to create an ultra-hard material with desired material properties.

Figure 1:
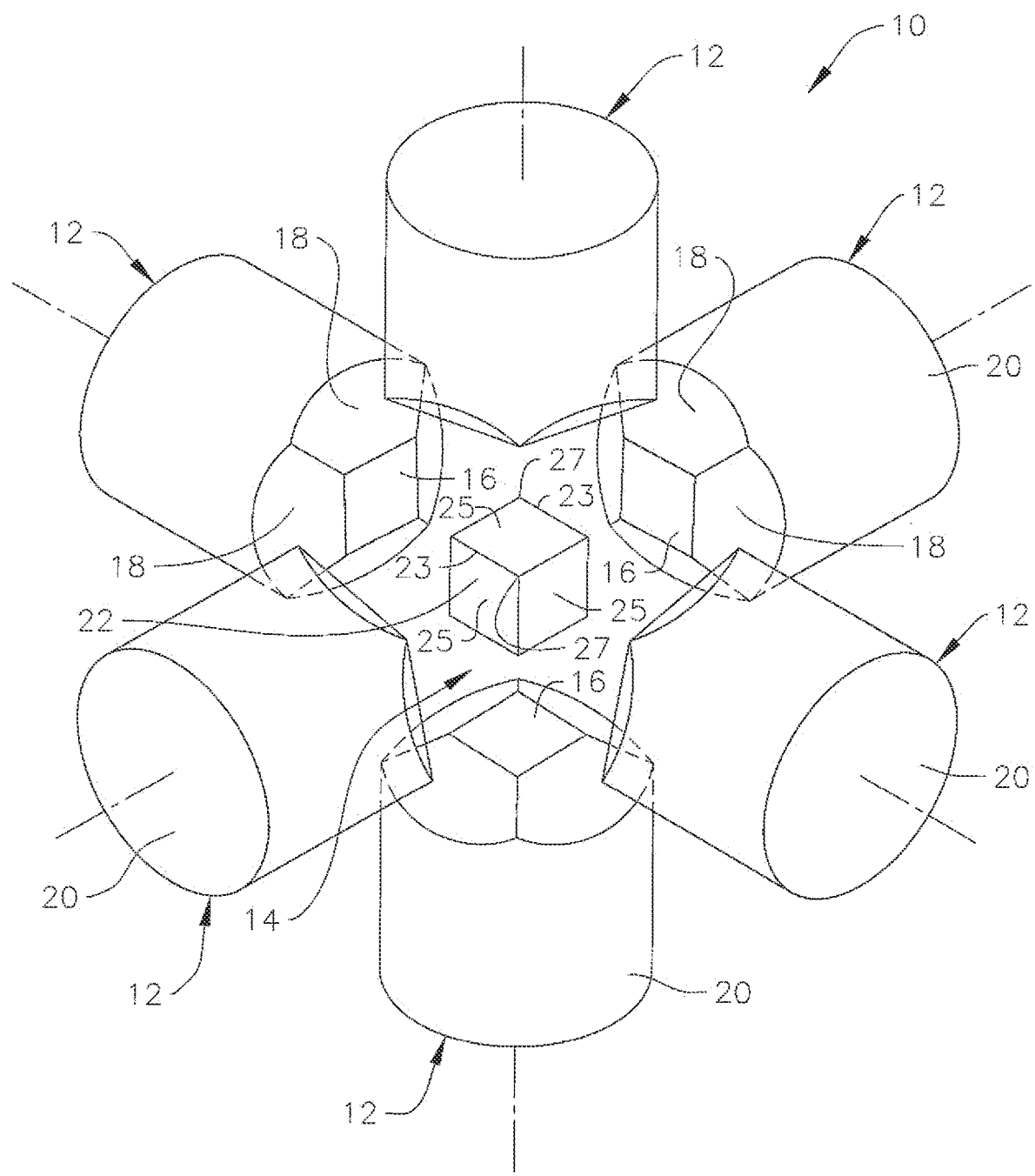
FIG. 1 illustrates a perspective view of a cubic press anvil assembly with a cubic container.

A portion of a cubic press assembly 10 is shown in FIG. 1 (the press frame and mechanisms for moving the anvils are not pictured). A cubic press is one form of high pressure/high temperature presses used for making diamond or cubic boron nitride or processing such materials into polycrystalline composites. Such presses are well described in patents and literature and are in use by several makers of diamonds (see U.S. Pat. Nos. 2,918,699, 3,159,876, 3,182,353, and 3,440,687, for example). As shown in FIG. 1, the press assembly 10 includes six cubic press anvils 12 arranged about a central pressure cell 14. Each anvil 12 includes a working face 16 facing into the pressure cell, a cylindrical base section 20, and a lateral face 18 sloping away from the working face 16 toward the base 20. Each anvil 12 has four lateral faces 18 in the shape of a truncated pyramid. The working face 16 is the face that directly applies pressure to the material being pressed. In FIG. 1, the working faces 16 are square, forming a cubic central cell 14. The material being pressed is contained within a container 22 placed inside the central pressure cell 14. The container is a cubic container having twelve edges 23 where adjacent sides 25 of the cube meet. The cube also has eight corners 27 where three edges 23 of the cube meet. During operation, the anvils 12 are synchronously moved toward each other by hydraulic actuators. The converging anvils apply increasing pressure on materials within the central pressure cell 14 defined by the anvil working faces 16. Anvils can be fabricated from single or multiple layers of cemented tungsten carbide. A typical anvil used in a cubic press is approximately 18 cm long with a base diameter of approximately 18 cm. In one embodiment, the lateral faces 18 slope away at a 45 degree angle from their corresponding working face.

A high-pressure press assembly 100 according to an embodiment of the present disclosure is shown in FIG. 2A in cross-section. The press assembly 100 includes a high-pressure press with six facing cubic press anvils 112 (four of which are shown in the figure) arranged about a central pressure cell 114. Each anvil includes a working face 116 and a lateral face 118 sloping to a base section 120. The lateral faces 118 of adjacent anvils face each other, leaving a gap 122 between them. In this embodiment, the working faces 116 are square and the central pressure cell 114 is cubic in geometry.

A container assembly 130 is received into the central pressure cell 114. The container assembly 130 includes a container 132 and a plurality of gaskets 134. The container includes a central opening or cavity 136 for receipt of the material sample that is to be pressed. For example, the material sample may be a powder mixture of diamond particles or hexagonal boron nitride particles which are to be HPHT sintered to form polycrystalline diamond or CBN. The material sample is placed within a can made of a refractory metal that can withstand high temperatures. The can and other components (such as a graphite heater tube, and salt for uniform pressure transmission) are placed together into the central opening or cavity 136 in the container 132. The opening 136 may be a vertical cylindrical bore sized to receive these components.

During HPHT sintering, the six anvils 112 are moved toward each other, so that the working faces 116 press inwardly on the container 132 and the material sample inside the container. As the anvils 112 are moved toward each other, the gasket material 134 flows from the cubic press cell 114 outwardly (in the direction of arrow A) into the gaps 122 between the anvils, as shown in FIG. 2A. As the pressure increases, the outward forces on the gasket 134 are balanced by frictional forces in the gasket material, and outward flow of the gasket material from the press cell 114 reduces or ceases. As pressurization proceeds, further anvil advancement and the development of high pressure in the pressure cell 114 are accomplished by thinning of the gasket 134. The gasket 134 thins by flowing both outwardly (arrow A) toward the anvil bases 120, increasing the gasket length, and inwardly (in the direction of arrow B) back into the pressure cell 114. This movement of gasket material allows for an increase of the pressure in the central pressure cell 114 and continues to seal the pressure within the cell 114. During the HPHT cycle, the loads (forces) applied to the anvils are split between the load carried by the container 132 and the load carried by the gaskets 134. The proportion of the split varies continuously during the cycle and is largely dependent on the length of the gasket.

After the pressure cycle is completed, the anvils 112 are retracted. This causes a decompression within the pressure cell 114. As the anvils retract, the loads on the gasket 134 and on the container 132 are reduced. However, the geometry of the system and the properties of the materials involved cause the loads (forces) on the gasket 134 to fall faster than the loads on the container 132. This causes an imbalance between the frictional forces on the gasket and the outward forces on the gasket exerted by the pressure cell. This imbalance in force causes flow of the gasket material outwardly (arrow A) from the pressure cell 114.

Thus, the material inside the pressure cell 114 moves and flows during the various stages of the HPHT sintering process. The container assembly 130 within the pressure cell should be sufficiently deformable to transmit pressure from the anvils to the sample being pressed, and also sufficiently strong to seal pressure within the pressure cell and resist being extruded entirely out of the pressure cell 114. If the material has low shear strength and good flow properties, it will provide good gasket sealing and flow, but it may be difficult to generate higher pressures due to excessive gasket flow. If a stronger, less flowable material is used, higher pressures can be generated, but the material may be unstable during compression and/or decompression. For example, the material may stick during decompression and then flow in a sudden release of pressure. When a single material is used to make up the container assembly, these demands on the material are in conflict.

During the pressure cycle, the material of the container 132 can also deform and flow within the cell 114 during loading and unloading.

According to an embodiment of the disclosure, the container assembly 130 includes a container 132 and a separate gasket 134 that meet at an interface 138. The container 132 and the gasket 134 are distinct components, separate from each other (although they may be connected to each other mechanically or adhesively, as described below). An example of a suitable adhesive for attaching the gasket to the container is AREMCO Ceramabond 835-M or AREMCO Ceramabond 671, manufactured by AREMCO Products, 707-B Executive Blvd, Valley Cottage, N.Y. 10089. In one embodiment, they are made of different materials. Additionally, the interface between these two materials is located within the central pressure cell 114. That is, prior to initiating the pressure cycle and applying pressure, the gasket 134, or a portion of the gasket 134, extends into the pressure cell 114. The container 132 is sized to provide space within the cell 114 for receipt of the gasket. The portion of the gasket located within the pressure cell is able to flow outwardly (arrow A) from the cell during decompression, to allow a more controlled decompression process, as described further below.

The embodiment of FIG. 2A will now be described in more detail. The container 132 has a cubic geometry and is dimensioned to fit within the cubic press cell 114. The cubic container 132 includes six sides 241 and cut-away edges 140 defined by cut-away edge portions of the cube. Adjacent sides 241 would meet along an edge had it not been cut-away. Each cut-away portion of the cube provides a space for the gasket 134 to extend into the pressure cell 114 with the container 132, between the container 132 and the working faces 116 of the anvils. The outer surface of the container 132 is thus shaped to provide a space at the cut-away edges for receipt of the gasket. The particular shape of this cut-away portion may vary in other embodiments. The cut-away portions 140 may take the shape of a recess formed into the outer surface of the container 132, or a curved or straight outer surface of the container that reduces the volume of the container 132 from a full cube. In the embodiment of FIG. 2A, the cut-away edges extend along the length of the cube, in the direction into and out of the page.

The container 132 with its cut-away portions or recesses is made of a strong material with good shear strength. In one embodiment, the material is a highly dense sintered or semi-sintered ceramic material. This material resists excessive flow and thereby enables high pressure to be generated inside the pressure cell 114. This material also provides thermal insulation for the high temperatures that are transmitted into the pressure cell 114, through the container, and to the material sample inside the container. In an embodiment, the container has higher strength and higher elastic modulus than the gasket material. Examples of suitable materials for the containers are sintered or semi-sintered ceramics such as $MgO$ or $Al_2O_3$ or geological materials such as Pyrophyllite (which may be fired at elevated temperatures to increase strength).

Another way of tailoring the properties of the container and gasket regions is to vary the amount of porosity in the material. Increasing the amount of porosity in a material results in a lower strength and allows more plastic deformation (strain) to take place without generating a pronounced pressure in the material. When all, or substantially all, of the porosity in the material is removed, such material will display normal elastic material characteristics. Thus, in an embodiment, the material of the gasket has a higher initial porosity than the material of the container.

In order to seal the pressure cell 114 while generating these ultra-high pressures, the separate gasket material 134 is provided. The gasket 134 is made from a material that has good flow properties at low pressures and shows an increase in shear strength at high pressures, such as a clay mineral, a phyllosilicate (e.g., pyrophyllite or talc), a synthetic material such as those described in U.S. Pat. No. 5,858,525, the contents of which are fully incorporated herein by reference, combination thereof, or any such material in combination with one or more suitable additives. The gasket 134 includes first and second portions 134A and 134B. The first portion 134A of the gasket is located within the pressure cell 114, extending into the space formed by the cut-away portion of the container 132. This first portion 134A of the gasket extends into the pressure cell 114 to the interface 138. The second portion 134B of the gasket extends outwardly from the pressure cell into the gaps 122 between adjacent anvil lateral faces 118. The first portion 134A of the gasket is shaped and dimensioned to match the shape of the cut-away portion or recess of the container 132. The first portion 134A of the gasket has a corresponding shape so that this portion 134A of the gasket mates with the cut-away portions of the container 132 at the interface 138. The first portion 134A of the gasket fills the space within the pressure cell 114 that is left by the outer surface of the container 132.

In one embodiment, the two portions 134A, 134B of the gasket are provided together as one integral gasket 134. In another embodiment, the two portions 134A, 134B may be separate, and they may be made of different materials. For example, the first portion 134A may be made of a material that is stronger and less flowable than the second portion 134B. In another embodiment, the gasket has a layered construction, with thin layers of gasket material stacked together to form the complete gasket 134 in the desired geometry. These layers may each be made of the same material or different materials. The gasket material may vary along the length of the gasket, for example, to provide a more flowable material between the anvils and a less flowable material in the pressure cell.

During high pressure operation, as the anvils begin moving inwardly toward each other, the gasket 134 flows outwardly into the gaps 122, in the direction of arrow A. This movement enables the anvils 112 to move toward each other and seals the gaps 122. As the pressure increases, the gasket 134 begins to thin, extending in both directions within the gap 122, lengthening the gasket. That is, the gasket 134 flows both outwardly (arrow A) away from the pressure cell 114 and inwardly (arrow B) into the pressure cell 114. The flow of the gasket further increases the pressure within the cell, while continuing to seal the gaps 122. Pressure continues to build in the central pressure cell 114 until the target pressure is reached and held for the desired length of time.

After the target pressure has been held for the desired interval, the anvils are then retracted. As they are retracted, the gaskets 134 unload more quickly than the container 132, due to the different material properties of the container and the gaskets and/or their geometry. During retraction, the gasket material tends to unload and change shape more quickly than the container does. This causes a pressure imbalance between the container 132 and the gasket 134 and causes the gasket 134 to be pushed outwardly from the pressure cell 114 (arrow A). The first portion 134A of the gasket provides additional gasket volume within the pressure cell that is available to flow into the gaps 122 during decompression, to replenish the loss in volume of the gaskets within the gaps 122. As the gasket material 134A flows into the gaps 122, the pressure on the container 132 within the cell 114 is reduced, and the gaps 122 remain sealed. Because the gasket has good flow properties, the flow of the portion 134A into the gaps 122 is smooth and relatively constant. As a result, the pressure cell 114 experiences a gradual and uniform decompression, rather than experiencing sudden releases of pressure due to sticking and slipping of the container material or due to a loss of pressure in the gaskets sealing the gaps 122. Such sudden releases of pressure (which may be referred to as a "decompression pop") can cause damage to the container, the material being pressed, and the components of the press itself. The deformable gasket material located within the central pressure cell controls flow during decompression and releases pressure from the cell in a stable and contained manner. The pressure in the cell can be slowly reduced while the gaps 122 remain sealed.

In the embodiment of FIG. 2A, the gaskets 134 are provided at each cut-away edge 140 of the cube container 132 and along each cut-away edge of the cube. Multiple gaskets 134 are provided according to the particular geometry of the press assembly 100. In FIG. 2A, twelve gaskets 134 are provided, one extending into each of the twelve gaps 122 between the anvils 112.

Each gasket 134 meets the container 132 at an interface 138, which is located within the pressure cell 114. At this interface, the outer surface of the container meets the gasket. The container and gasket may be physically attached to each other at this interface 138, such as by adhesive, glue, or a mechanical connection. For example, the container 132 may include a slot (see slot 350 in FIG. 4) formed in the outer surface of the container 132. The slot may be just a few millimeters wide and deep. The gasket then includes a mating protrusion (see protrusion 352 in FIG. 4) that is sized to match the slot. The gasket can then be mated to the container with the protrusion fitting into the slot. Frictional forces at the engagement of the slot and protrusion help to secure the container and gasket to each other. As another example, the gasket and container could be formed with a mating dove-tail (tongue and groove) connection, such that the gasket is slid into place on the container. In another embodiment, the container and the gasket may simply be placed next to each other in the pressure cell 114, with the container contacting the gasket at the interface 138. The gaskets may be mechanically connected to the anvils, with the container then placed between the gaskets.

Figure 2B:
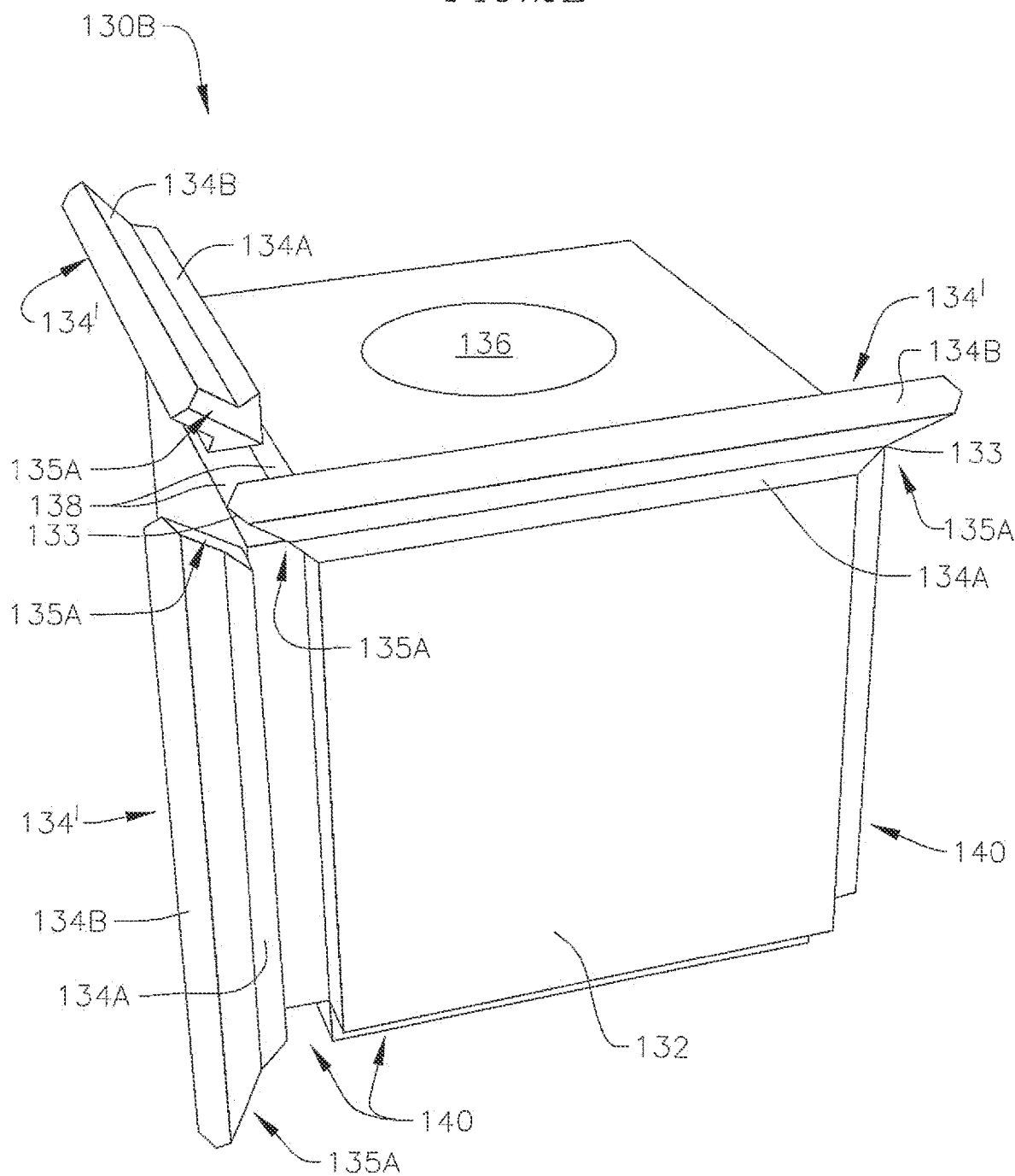
FIG. 2B illustrates a partial perspective view of an example container assembly according to an embodiment of the present disclosure.

A perspective view of a container assembly 130B is shown in FIG. 2B. In this embodiment, the container assembly 130B includes a container 132 and twelve gaskets 134'. Three gaskets 134' are shown in FIG. 2B, to show the placement and orientation of the gaskets around the container. The container 132 is formed as a cube with cut-away portions 140 along the cube's edges and corners. The gaskets 134' include a first portion 134A that is shaped to be received on surfaces 138 defined by the cut-away portion 140 of the container. The gaskets 134' meet the container at a right-angle interface defined by the surfaces 138 formed by the cut-away portions 140 of the container. The gaskets 134' meet each other at beveled or tapered surfaces 135A at each opposite end of each gasket. These surfaces 135A, in an embodiment, are sloped at a 45 degree angle so that the gaskets 134' meet each other and completely seal the corners 133 of the cube. The corners of the cube are the location where three edges of the cube would meet, had they not been cut-away. When the container assembly 130B is provided in a high-pressure press, the container 132 and the first portion 134A of each gasket 134' fit entirely within the central pressure cell. The second portion 134B of each gasket extends into the gaps 122 between the anvils.

Figure 3A:
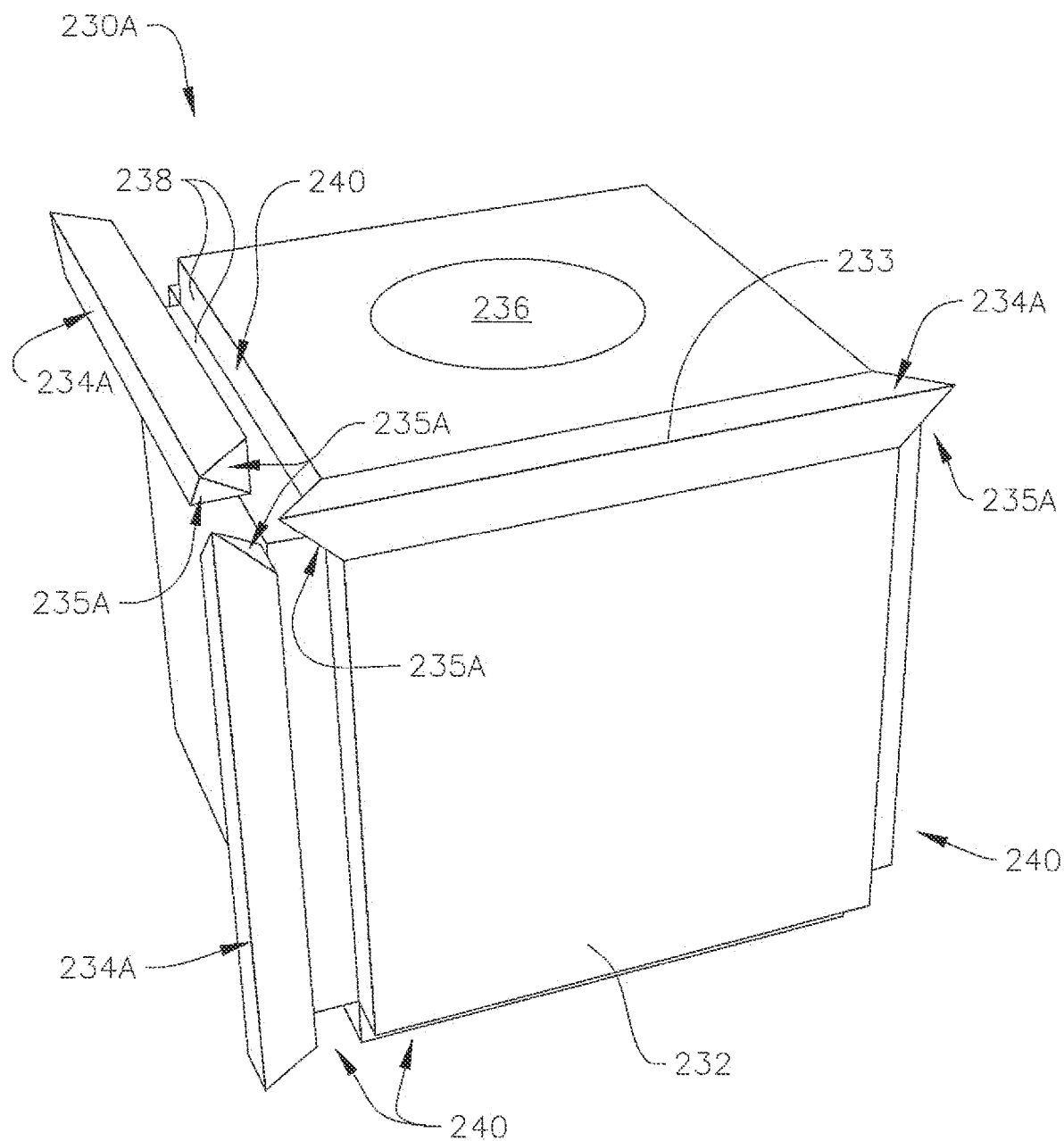
FIG. 3A illustrates a partial perspective view of an example container assembly according to an embodiment of the present disclosure.

A container assembly 230A according to an embodiment of the present disclosure is shown in FIG. 3A. The container assembly 230A includes a cubic container 232 and a plurality of gaskets 234A (only three of which are shown in FIG. 3A). The container 232 is formed as a cube with cut-away portions 240 along the cube's edges and corners. The gaskets 234A are shaped to be received into these cut-away portions 240 and to complete the outer geometry of the cube. The gaskets 234A meet the container at a right-angle interface defined by surfaces 238 formed by the cut-away portions 240 of the container. The gaskets 234A meet each other at beveled or tapered surfaces 235A at each opposite end of each gasket. These surfaces 235A are sloped at a 45 degree angle so that the gaskets 234A meet each other and completely seal the corners of the cube. In this embodiment, each entire gasket is received into each cut-away portion. Together, the container 232 and the gaskets 234A form a cube with accentuated edges 233 which is sized and shaped to fit within the central pressure cell of a high-pressure press such that when pressure is applied, the gaskets 234A pressurize first and extrude outwardly from the pressure cell into the gaps 122 between the anvils.

Figure 3B:
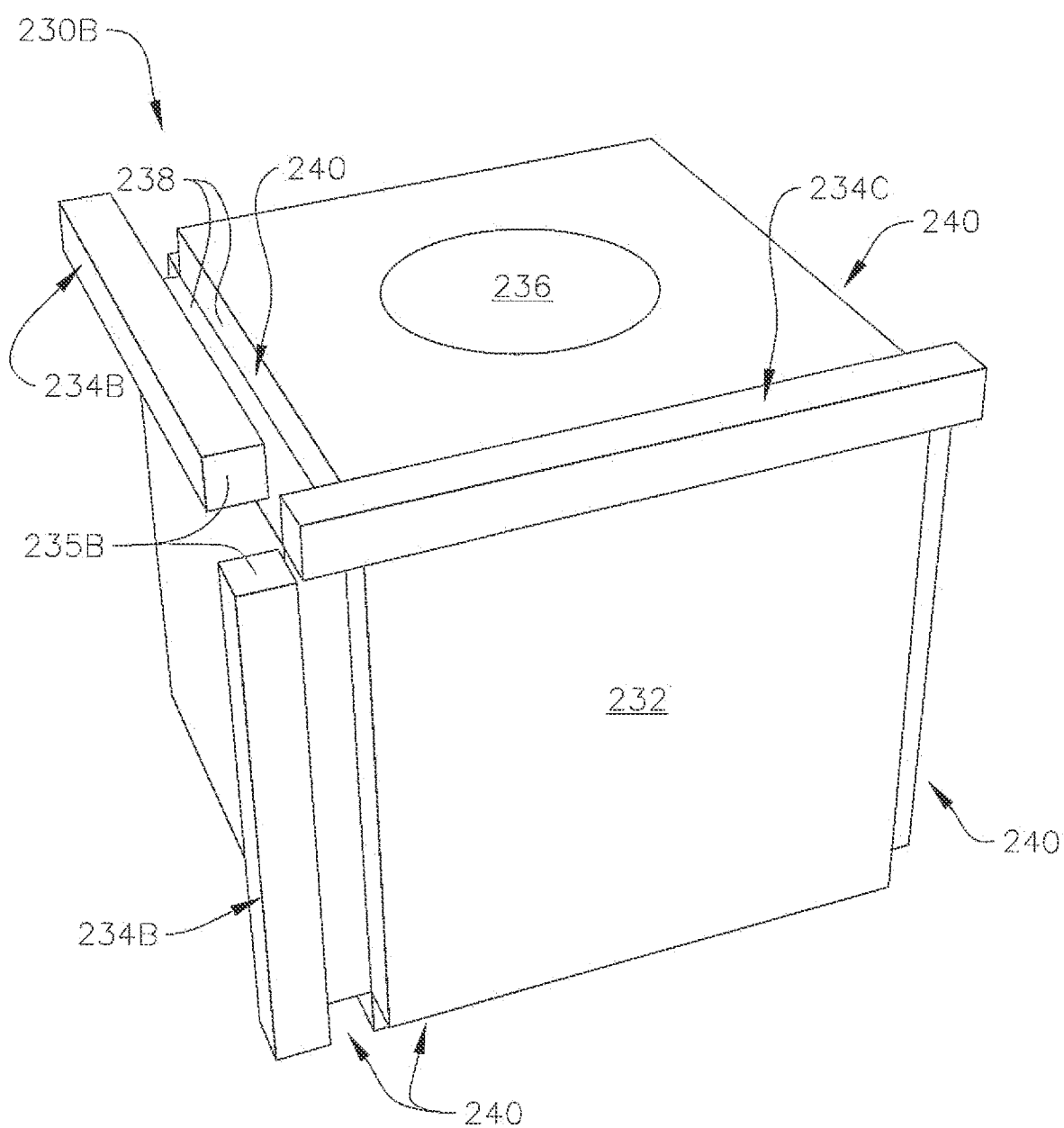
FIG. 3B illustrates a partial perspective view of an example container assembly according to an embodiment of the present disclosure.

A container assembly 230B according to an embodiment of the present disclosure is shown in FIG. 3B. The container assembly 230B includes a cubic container 232 and a plurality of gaskets 234B and 234C (only three of which are shown in FIG. 3B). The container 232 is formed as a cube with cut-away portions 240 along the cube's edges and corners. The gaskets 234B and 234C are shaped to be received onto surfaces 238 defined these cut-away portions 240 and to complete the outer geometry of the cube. In this embodiment, two gaskets of different lengths are provided in order to seal the corners of the cube. The gaskets include eight gaskets 234B which are shorter than the remaining four gaskets 234C. The longer gaskets 234C extend outwardly to overlap the end surfaces 235B of the shorter gaskets 234B. This overlapping length of the longer gaskets 234C fills in the corners of the cube with gasket material. In an embodiment, each gasket is a rectangular prism having a square cross section. In this embodiment, the entire gasket is received into this cut-away portion. In other embodiments, each gasket is a rectangular prism having dimensions longer than the cut-away portions. In such an embodiment, the cross sections of each gasket may or may not be square. During press operations, the gaskets 234B and 234C pressurize between the containers extrude outwardly from the pressure cell into the gaps between the anvils. In one embodiment, as shown in FIG. 3B, when added to the surfaces defined by the cut-away portions, the gaskets along with the container define a cube. In another embodiment, the gaskets extend beyond one or both surfaces 238 defined by the container cut-away portions.

A container assembly 230C according to an embodiment of the present disclosure is shown in FIG. 3C. The container assembly 230C includes a cubic container 232 and a plurality gaskets 234A (i.e., twelve gaskets, only three of which are shown in FIG. 3C). Container 232 is formed as a cube with a cut-away portion 240 along each of the cube's edges for receiving the gaskets. Each of the twelve gaskets 234C used has a rectangular cross-section as viewed along a plane perpendicular to the gasket's longitudinal axis and has beveled or tapered surfaces 235C at each opposite end of each gasket defining a vertex 237. These surfaces 235C are sloped in an embodiment at a 45 degree angle so that the gaskets 234C mate with each other and completely seal the corners of the cube when the gaskets are installed on the cut-away portions 240. In this embodiment, the entire lower surface of each gasket is received and mates a corresponding cut-away portion 240 and specifically with a surface 242 defined by a corresponding cut-away portion at the cube edge. When assembled, the gaskets 234C extend beyond each side 241 defining the cubic container 232 of the cube when pressure is applied by the high-pressure press, the gaskets pressurize before the cube and extend into the gaps sealing the pressure cell.

A container assembly 330 according to an embodiment of the present disclosure is shown in cross-section in FIG. 4. In this embodiment, the gaskets 334 are triangular in cross-section, and the interface surface 338 between the gaskets 334 and the container 332 is a straight, slanted interface surface 338 where the two meet. The container 332 includes cut-away edges formed by the slanted surfaces between adjacent sides 241 of the container. In the embodiment shown in FIG. 4, the gaskets along with the container define a cube. In another embodiment, the gaskets may occupy a volume greater than a volume of the cut-away portion of the container which cube defined the interface surface 338. FIGS. 2A, 3A, 3B, 3C and 4 show some of the variations in geometry that may be utilized for the container and the gasket. Other variations may be used as well including curved cut-away portions or recesses in the outer surface of the container. The cut-away portion surfaces, as for example surfaces 238, 242 may have spherical, cylindrical, triangular or other shapes in cross-section. It should be understood that the cut-away portions may not necessarily be portions that are cut-away after the cube is formed, as the cube may be formed with the cut-away portions.

In one embodiment, the total cut-away portion of the cubic container (that is, including each cut-away edge and depression, if formed on the cut-away edge) occupies about 5-10% of the volume of the press cell. In a cubic press cell, the cut-away portion occupies about 5-10% of the volume of the cube. For example, about 5-10% of the volume of a cubic container is removed to form the cut-away portions. The amount of the gasket material that extends into the press cell occupies this 5-10% volume. The gasket may be fully contained within this 5-10% press cell volume, as shown for example in FIGS. 3A, 3B, and 4, or it may extend outwardly from the press cell, as shown in FIGS. 2A and 2B. In either case, the amount of space provided for the gasket within the press cell is about 5-10% of the volume of the cell, between the anvil working faces. In other embodiments, the gasket volume within the press cell ranges between 1-20% of the volume of the cell, such as 1-5%, 5-10%, 10-15%, or 15-20%. In one embodiment the gasket volume within the press cell ranges between 7-16% of the volume of the cell.

As can be seen, in some embodiments, the gaskets have a volume that equals the volume of the cubic container cut-away portions such that when the gaskets are mated to the surfaces of the container defined by the removal of the cut-away portions, the container with mated gaskets define a cube. In other embodiments, the volume of the gaskets exceeds the volume of the cubic container cut-away portions, such that when the gaskets are mated to the container surfaces defined by the removal of cut-away portions, the container with the mated gaskets define a cube with accentuated edges or with the gaskets extending beyond the sides of the container. In the case of embodiments where the container and the gaskets define a cube with accentuated edges, the overall geometry of the cube with gaskets is such that when pressure is applied by the high-pressure press, the gaskets pressurize before the cube and extend into the gaps sealing the pressure cell.

Figure 5:
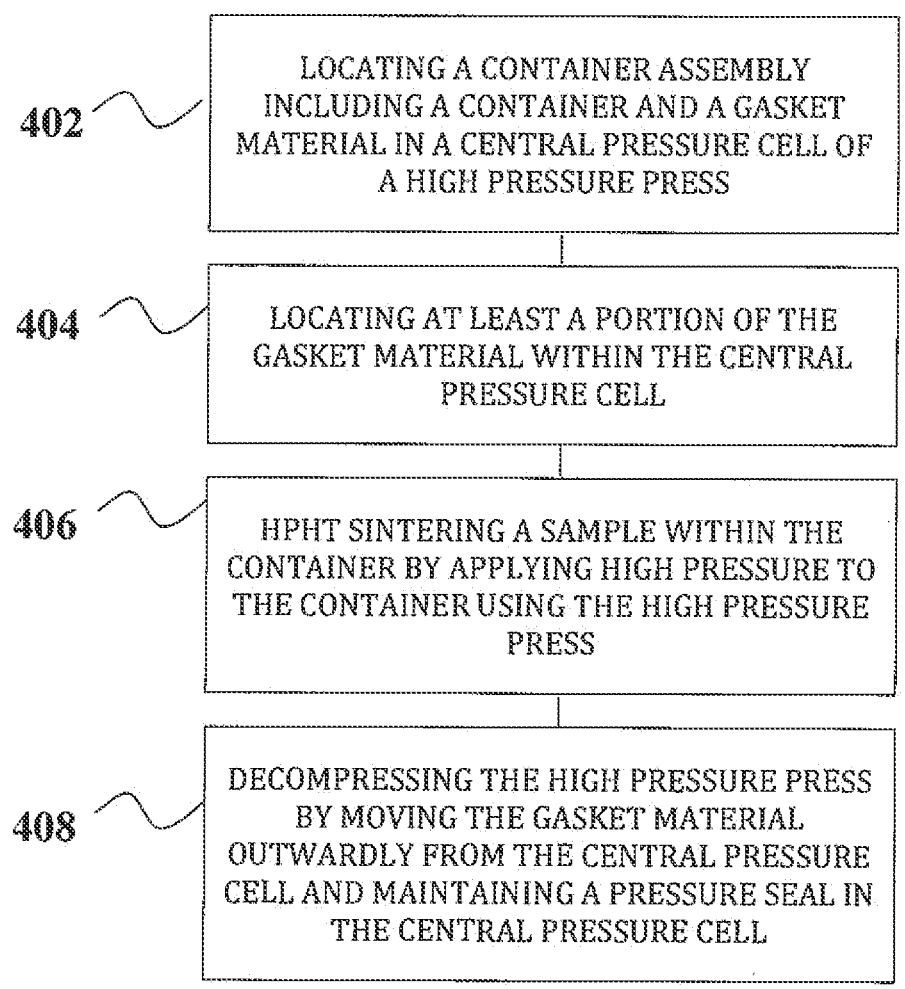
FIG. 5 illustrates a flow chart of a method of an example embodiment of the present disclosure.

In one embodiment, a method for sealing a high-pressure press is provided (FIG. 5). The method includes locating a container assembly including a container and a gasket material in the central pressure cell of a high-pressure press (block 402), and locating at least a portion of the gasket material within the central pressure cell (block 404). The method also includes HPHT sintering a sample within the container by applying high pressure to the container using said high-pressure press (block 406), and decompressing the high-pressure press by moving the gasket material outwardly from the central pressure cell while maintaining a pressure seal on the central pressure cell (block 408).

In another embodiment, a method for sealing a high-pressure is provided. The method includes locating a container assembly in the central pressure cell of a high-pressure press assembly. The container assembly includes a container and a gasket, and at least a portion of the gasket is located within the central pressure cell. The container includes a material sample inside the container that is to be pressed at high pressure. The method includes HPHT sintering the sample, which includes operating the high-pressure press to apply a high pressure (such as 5 to 15 GPa or 6 to 12 GPa) at an elevated temperature (such as 1300 to 2400° C., or 1450 to 2200° C.) within the central pressure cell. During operation, the gasket material moves and flows. In a cubic press assembly, the gasket material flows into the gaps between the advancing cubic anvils. The method includes sealing the gaps during the high pressure operations, by flowing the gasket material within the gaps. The method also includes relieving the pressure on the central pressure cell in a stable and controlled manner and maintaining a pressure seal during decompression. This includes retracting the anvils and flowing the gasket material outwardly from the central pressure cell into the gaps between the anvils. The outward flow of the gasket material from the cell during decompression provides stability during decompression and maintains a seal of the gaps between the anvils. According to embodiments of this method, higher pressures can be achieved during HPHT sintering with a controlled and stable decompression from these high pressures.

Although embodiments herein are described with reference to a cubic press, the container assembly may be used in other types of presses as well, such as a belt press or a toroidal press.

Although only a few example embodiments have been described in detail above, those skilled in the art will readily appreciate that many modifications are possible in the example embodiments without materially departing from this invention. Accordingly, all such modifications are intended to be included within the scope of the disclosure as defined in the following claims.

What is claimed is:

1. A high-pressure cubic press system, comprising:
   six cubic anvils arranged about a central pressure cell with a gap between adjacent anvils;
   a container placed within the central pressure cell, the container receiving a sample to be pressed; and
   a plurality of separate gaskets, wherein each of the plurality of separate gaskets is distinct from the container, and is mated to the container and extends at least partially into the central pressure cell.

2. The system of claim 1, wherein the container is a cube, and wherein each edge of the cube is cut-away defining a cut-away surface, and wherein the plurality of separate gaskets comprises twelve gaskets, wherein each of the twelve gaskets interfaces with a distinct cut-away surface.

3. The system of claim 2, wherein the container with the interfacing gaskets define a cube.

4. The system of claim 2, wherein the container with the interfacing gaskets define a cube having accentuated edges.

5. The system of claim 2, wherein the plurality of gaskets and the container are made of different materials.

6. A high-pressure press system, comprising:
   a plurality of anvils arranged about a central pressure cell with a gap between adjacent anvils;

a container placed within the central pressure cell, the container receiving a sample to be pressed; and a plurality of separate gaskets, wherein each of the plurality of separate gaskets is distinct from the container, and is mated to the container and extends at least partially into the central pressure cell.

7. The system of claim 6, wherein the container is a cube, and wherein each edge of the cube is cut-away defining a cut-away surface, and wherein the plurality of separate gaskets comprises twelve gaskets, wherein each of the twelve gaskets interfaces with a distinct cut-away surface.

8. The system of claim 7, wherein the container with the interfacing gaskets define a cube.

9. The system of claim 7, wherein the container with the interfacing gaskets define a cube having accentuated edges.

10. The system of claim 7, wherein the plurality of gaskets and the container are made of different materials.

11. The system of claim 6, wherein the anvils are cubic.

12. The system of claim 6, comprising six anvils.

\* \* \* \* \*